US006864945B2

(12) United States Patent
Fujimori et al.

(10) Patent No.: US 6,864,945 B2
(45) Date of Patent: Mar. 8, 2005

(54) LIQUID CRYSTAL DISPLAY AND MANUFACTURING METHOD THEREOF

(75) Inventors: Koichi Fujimori, Nabari (JP); Yozo Narutaki, Yamatokoriyama (JP); Tokihiko Shinomiya, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 107 days.

(21) Appl. No.: 09/932,027

(22) Filed: Aug. 20, 2001

(65) Prior Publication Data

US 2002/0075441 A1 Jun. 20, 2002

(30) Foreign Application Priority Data

Aug. 30, 2000 (JP) ....................................... 2000-261652

(51) Int. Cl.[7] .......................................... G02F 1/1339
(52) U.S. Cl. ..................... 349/156; 349/113; 349/138
(58) Field of Search .............................. 349/106, 110, 349/113, 122, 43, 155, 156, 157, 138, 123

(56) References Cited

U.S. PATENT DOCUMENTS

| | | | | |
|---|---|---|---|---|
| 5,952,676 | A | * 9/1999 | Sato et al. ................... | 257/59 |
| 5,978,061 | A | 11/1999 | Miyazaki et al. | |
| 6,016,181 | A | 1/2000 | Shimada | |
| 6,072,557 | A | * 6/2000 | Kishimoto .................. | 349/156 |
| 6,195,140 | B1 | 2/2001 | Kubo et al. | |
| 6,295,109 | B1 | * 9/2001 | Kubo et al. ................. | 349/119 |
| 6,341,002 | B1 | * 1/2002 | Shimizu et al. ............. | 349/119 |
| 6,525,788 | B1 | * 2/2003 | Nakagawa et al. .......... | 349/44 |
| 6,620,655 | B2 | * 9/2003 | Ha et al. .................... | 438/149 |
| 6,639,639 | B2 | * 10/2003 | Baek et al. ................. | 349/113 |

FOREIGN PATENT DOCUMENTS

| | | |
|---|---|---|
| EP | 1 048 972 A2 | 11/2000 |
| JP | 50-39095 B | 4/1975 |
| JP | 54-4154 | 1/1979 |
| JP | 56-33626 A | 4/1981 |
| JP | 56-99384 A | 8/1981 |
| JP | 59-143124 A | 8/1984 |
| JP | 61-173221 A | 8/1986 |
| JP | 61-184518 | 8/1986 |
| JP | 61-267736 A | 11/1986 |
| JP | 62-239126 A | 10/1987 |
| JP | 63-104021 | 5/1988 |
| JP | 63-116126 A | 5/1988 |
| JP | 64-015719 | 1/1989 |
| JP | 04-198919 | 7/1992 |
| JP | 09-073099 | 3/1997 |
| JP | 09-127516 | 5/1997 |
| JP | 09-127525 | 5/1997 |
| JP | 10-68955 A | 3/1998 |
| JP | 10-197877 A | 7/1998 |
| JP | 8-234190 | 9/1998 |
| JP | 11-109390 | 4/1999 |
| JP | 2000-081622 | 3/2000 |
| JP | 2000-187210 | 7/2000 |

OTHER PUBLICATIONS

Korean Office Action mailed Feb. 26, 2003 in corresponding Korean application SN 10–2001–0051999.

* cited by examiner

*Primary Examiner*—Tarifur R. Chowdhury
*Assistant Examiner*—David Chung
(74) *Attorney, Agent, or Firm*—Nixon & Vanderhye PC

(57) ABSTRACT

A liquid crystal display has spacers for maintaining a liquid crystal layer and a cell gap between a substrate and an opposite substrate and also has regions either within a single pixel or over two or more pixels. The spacers are of columnar shape elongated from the substrate to the opposite substrate or the other way round, and the columnar spacers are provided in regions in which the liquid crystal layer is thinnest among those regions in which the liquid crystal layer varies in thickness. The structure makes the liquid crystal display having two or more different cell gaps to stably maintain those cell gaps and produces good quality displays.

14 Claims, 11 Drawing Sheets

ONE PIXEL

F I G. 7
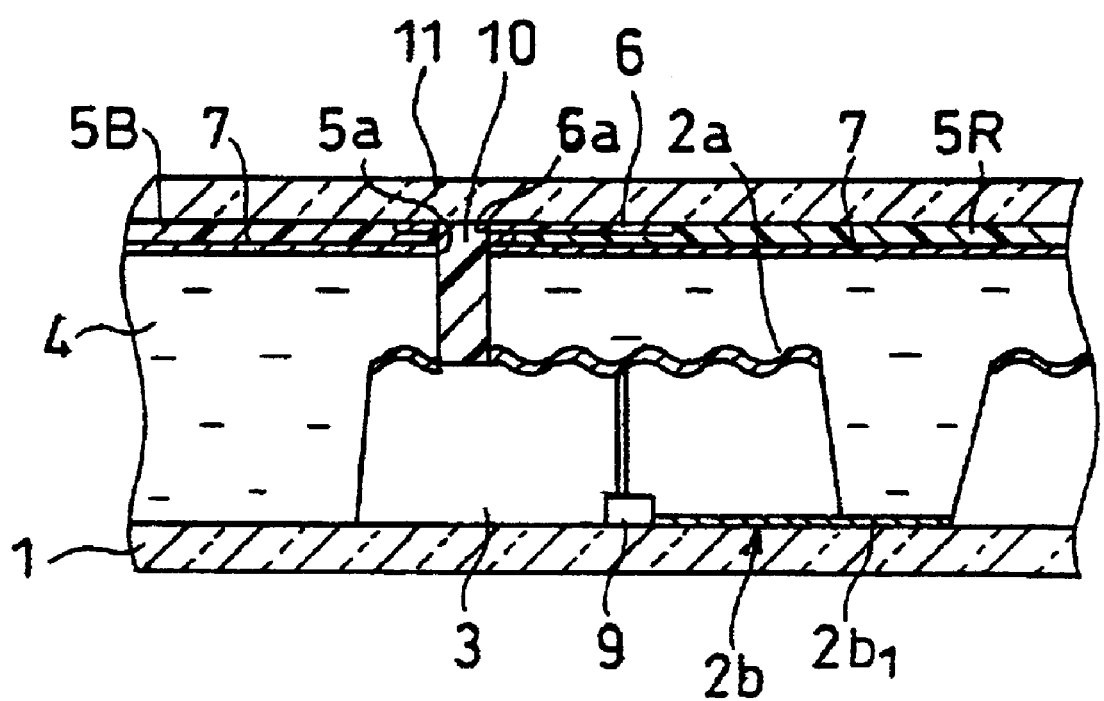

LIQUID CRYSTAL DISPLAY AND MANUFACTURING METHOD THEREOF

FIELD OF THE INVENTION

The present invention relates to liquid crystal displays in general and those liquid crystal displays with a liquid crystal layer that varies in thickness from one pixel to another or within one pixel in particular, and further relates to manufacturing methods of those liquid crystal displays.

BACKGROUND OF THE INVENTION

Liquid crystal displays are thin and low power-consuming and for these reasons are used extensively for example, in office automation equipment, such as word processor devices and personal computers; personal digital assistants, such as electronic note pads; and VTRs with a built-in camera and a liquid crystal monitor.

Liquid crystal panels do not emit light as CRTs (Cathode Ray Tubes) and EL (electroluminescense) displays. Instead, some liquid crystal panels include in the back thereof a section containing a so-called backlight, which is a fluorescent tube, and produces a display by controlling the transmission/interruption of the light emitted by the backlight. These liquid crystal displays are termed transmissive types.

Under very bright ambient light, the transmissive liquid crystal display cannot provide satisfactory visibility because of its relatively dark appearance. In addition, the backlight consumes so much power that it typically accounts for more than half the total power consumption of the liquid crystal display.

To solve these problems, the personal digital assistant, which is often carried and used outdoors, incorporates a reflective liquid crystal display with a reflector plate in place of a backlight to produce a display by controlling the transmission/interruption of the light reflected off the reflector plate. Some reflective liquid crystal displays include a polarizer plate and operate in TN (twisted nematic) mode or STN (super twisted nematic) mode, while others operate in phase change guest-host mode without a polarizer plate and therefore can produce a bright display. Extensive research and development is being performed recently on the phase change guest-host mode.

Conversely to the transmissive liquid crystal display, the reflective liquid crystal display, which depends on reflected light for a display, cannot provide satisfactory visibility under poor ambient illumination. Further, if the reflector plate is provided outside the glass substrates that sandwich a liquid crystal layer in the liquid crystal display, an overlapping, slightly displaced image occurs because of the parallax between the liquid crystal layer and the reflector plate and degrades the display quality of the true image. In addition, if an undulating reflector plate is provided between the glass substrates so as to be in contact with the liquid crystal layer, the undulations of the reflector plate make it difficult to maintain a preferably uniform distance between the glass substrates.

To address the poor visibility of the transmissive liquid crystal display and the reflective liquid crystal display, a liquid crystal display incorporating a transmissive reflector film and a the-hybrid liquid crystal display that operates both as a transmission type and a reflection type are being developed. The latter, hybrid type includes a backlight and a reflector plate part of which has holes so that the reflector plate can transmit the light emitted by the backlight. The hybrid type switches between reflection and transmission mode by turning on/off the backlight, hence operating as a transmissive type when ambient light is insufficient and as a reflective type when ambient light is sufficient. The reflector plate has undulations that scatter light when operating in reflection mode to produce a bright display.

The liquid crystal cell in the liquid crystal display is constructed of two substrates disposed opposite each other to provide a gap to inject liquid crystal. The substrates are made of glass or other material. The distance by which the opposing substrates are separated, that is, the cell gap, is typically maintained by spherical particles, or so-called spacers, that are provided randomly all over the substrate.

For example, Japanese Laid-Open Patent Application No. 11-101992/1999 (Tokukaihei 11-101992; published on Apr. 13, 1999) discloses a transmission/reflection hybrid liquid crystal display having TFTs 111, pixel electrodes 102, and an interlayer insulation layer 110 on a substrate 105 as shown in FIG. 9. On the opposite substrate 104 are deposited a color filter 107 with a BM 106, a transparent electrode 108, and alignment layer 109 in this order.

The substrate 105 and the opposite substrate 104 are located opposite each other and separated by spherical spacers 103. Liquid crystal is injected between the two substrates to form a liquid crystal layer 101. In each pixel, there is provided a pixel electrode 102 divided into a reflection region 102a made of a metal film and a transmission region 102b made of ITO. The cell gap, that is, the gap where liquid crystal is injected, is half as large over the reflection region 102a of the pixel electrode 102 as over the transmission region 102b. A desired cell gap is provided, for example, by means of the spherical spacers 103 that are distributed in the layer in suitable numbers.

The structure in which the cell gap over the reflection region 102a is reduced to half that over the transmission region 102b prevents an overlapping, slightly displaced image from occurring and thus degrading the display quality of the true image. Another advantage of the structure is that the undulations of the reflection region 102a do not negatively affect the cell gap because the reflection region 102a is located on the interlayer insulation layer 110.

According to the foregoing patent application, the cell gap is practically dictated by the diameter of the spherical spacers 103. Therefore, if the density of the spherical spacers 103 varies from place to place on the substrates 104 and 105, the cell gap also varies. Stably controlling the density of the spherical spacers 103 is difficult and results in the following problems.

As shown in FIGS. 10(a), 10(b), the cell gap varies greatly depending on the size and density of the distributed spherical spacers 103. FIG. 10(a) is an example of relatively many spherical spacers 103 being distributed, whereas FIG. 10(b) is an example of relatively few spherical spacers 103 being distributed for comparison.

In these examples, $d_1 > d_2$ where $d_1$ is the cell gap over the reflection region when there are relatively many spherical spacers 103 being distributed (see FIG. 10(a)), and $d_2$ is the cell gap over the reflection region when there are relatively few spherical spacers 103 being distributed (see FIG. 10(b)).

Further, $d_3 > d_4$ where $d_3$ is the cell gap over the transmission region when there are relatively many spherical spacers 103 being distributed (see FIG. 10(a)), and $d_4$ is the cell gap over the transmission region when there are relatively few spherical spacers 103 being distributed (see FIG. 10(b)).

As can be understood from these examples, a stable cell gap is difficult to obtain with the use of the spherical spacers 103 because the cell gap is affected by the density of the spherical spacers 103. Besides, the density is difficult to control stably.

Even if the spherical spacers 103 are uniformly distributed, the spherical spacers 103 whose size is adjusted for the smaller cell gap are too small to provide a suitable cell gap in regions where the cell gap must be larger.

If the spherical spacers 103 are distributed in great numbers in consideration of these problems, the spherical spacers 103 aggregate. The aggregation of the spherical spacers 103, especially, in regions where the cell gap is small, causes those spherical spacers 103 to be pressed and carve into the electrodes sandwiching the spherical spacers 103, i.e., the reflection region 102a and the transparent electrode 108 (see FIG. 9) when the substrates 104, 105 are pressed to combine them. The carving refuse is conductive and causes leak current to run between the substrates. The leak current increases remarkably if the smaller cell gap is less than 3 µm.

As in the above, the cell thickness is more difficult to control and defects, such as current leak, are more likely to develop in the liquid crystal display with two different cell gaps, small and large, than in the liquid crystal display with a single cell gap.

The distributed spherical spacers 103 disturb the alignment of the liquid crystal in proximity thereto and cause light leak therearound, which reduces pixel contrast of the liquid crystal display.

In the transmission/reflection hybrid liquid crystal display, if the electrode in the reflection region 102a is configured in MRS (Micro Reflector Structure) with undulations that double as a reflector plate as shown in FIG. 11, the cell gap varies depending on where the spherical spacer 103 is located in the undulations in the reflection region 102a.

A technology recently getting peoples' attention is to distribute columnar spacers made of resin or other material instead of spherical spacers.

The following briefly introduces some conventional examples of columnar spacers employed in the reflective liquid crystal display or the transmissive liquid crystal display.

Japanese Laid-Open Patent Application No. 50-39095/1975 (Tokukaisho 50-39095; published on Apr. 10, 1975), Japanese Laid-Open Patent Application No. 59-143124/1984 (Tokukaisho 59-143124; published on Aug. 16, 1984), Japanese Laid-Open Patent Application No. 56-33626/1981 (Tokukaisho 56-33626; published on Apr. 4, 1981), and Japanese Laid-Open Patent Application No. 56-99384/1981 (Tokukaisho 56-99384; published on Aug. 10, 1981), among others, disclose spherical spacers being distributed at given places on one of the substrates composing the liquid crystal cell by means of photolithography and other techniques.

According to the disclosure of these patent applications, ITO electrodes, columnar spacers, and an alignment film are formed on a glass substrate to which color filters are provided. These members may be provided in any order, as long as it is the alignment film that is formed last of all.

Japanese Laid-Open Patent Application No. 61-173221/1986 (Tokukaisho 61-173221; published on Aug. 4, 1986) discloses columnar spacers made of an organic resin such as polyimide. Japanese Laid-Open Patent Application No. 54-4154/1979 (Tokukaisho 54-4154; published on Jan. 12, 1979) discloses columnar spacers made of an inorganic resin, such as $SiO_2$, or a metal.

Aforementioned Patent Application No. 56-99384/1981 discloses photosensitive columnar spacers. Japanese Laid-Open Patent Application No. 63-116126/1988 (Tokukaisho 63-116126; published on May 20, 1988) discloses columnar spacers made of a black resin.

Further alternatives are suggested to form columnar spacers by depositing color filters. It is known that, for example, the columnar spacers are disposed between electrodes or a non-transmissive member such as an electrode or on a black matrix of a color filter (see Japanese Laid-Open Patent Application No. 62-239126/1987 (Tokukaisho 62-239126; published on Oct. 20, 1987) for an example). The shape may vary and include dot-shaped (adductor-shaped) ones and stripes as disclosed in aforementioned Japanese Laid-Open Patent Application No. 63-116126/1988.

The columnar spacers are advantageous in that they can be fabricated by photolithography, printing, transfer, etc. and their density and the size of the individual spacer can therefore be set to any given values.

Japanese Laid-Open Patent Application No. 61-267736/1986 (Tokukaisho 61-267736; published on Nov. 27, 1986) discloses the inclusion of 0.1 to 100 protrusions, 20 µm long or less on each side, for every 1 $mm^2$ of the area of the substrate to provide an extra shock resistance to ferroelectric liquid crystal.

U.S. Pat. No. 5,978,061 (corresponding to Japanese Laid-Open Patent Application No. 9-73093/1997 (Tokukaihei 9-73093; published on Mar. 18, 1997)), Japanese Laid-Open Patent Application No. 9-73099/1997 (Tokukaihei 9-73099; published on Mar. 18, 1997), and Japanese Laid-Open Patent Application No. 9-73088/1997 (Tokukaihei 9-73088; published on Mar. 18, 1997) specifies the ratio of the area occupied by columnar spacers per unit area of the substrate for the stable supply in the cell gap of the liquid crystal cell and the prevention of bubble formation at low temperatures.

However, none of the patent applications listed above sufficiently discusses the distribution structure, of columnar spacers, which provides two or more different, stable cell gaps in a liquid crystal display.

Further, none of the patent applications discusses an arrangement to prevent the alignment from developing a defect in proximity to columnar spacers when the alignment film is subjected to a rubbing treatment after the columnar spacers are formed.

The present invention addresses these conventional problems and has an objective to provide a liquid crystal display that has two or more different, stable cell gaps and still exhibits high display quality.

SUMMARY OF THE INVENTION

A principal objective of the present invention is to provide a liquid crystal display that has two or more different, stable cell gaps and still exhibits high display quality and also provide a manufacturing method of such a liquid crystal display.

A liquid crystal display in accordance with the present invention, in order to solve the foregoing problems, has two opposing substrates sandwiching therebetween a liquid crystal layer variable in thickness either within a single pixel or from one pixel to another, wherein there are provided columnar spacers between the two substrates where the liquid crystal layer is thinnest, the columnar spacers being elongated in a direction connecting the two substrates to maintain a cell gap.

Generally, it is more difficult to control a small cell gap than a large cell gap.

However, according to the structure, the spacers are of columnar shape elongated in the direction connecting the two substrates and are provided where the liquid crystal layer is thinnest; therefore, the structure ensures the cell gap where the liquid crystal layer is thin, that is, the cell gap is small.

Thus, the thickness of the liquid crystal layer is easily controllable. Further, the two substrates are subjected to uniform pressure in the combining step of the two substrates. A uniform cell gap is stably obtainable in the step because of the columnar spacers provided where the liquid crystal layer is thin and hence it is most difficult to control the cell gap.

A manufacturing method of a liquid crystal display in accordance with the present invention includes the sequential steps of: providing a transparent electrode on a substrate to drive liquid crystal; providing columnar spacers on the transparent electrode; and providing an alignment layer over the entire substrate.

According to the method, the provision of the columnar spacers enables the liquid crystal display to exhibit uniform and cell gap properties. Further, the provision of the alignment layer after that of the columnar spacers prevents the material and developing liquid used in providing the columnar spacers from adversely affecting the alignment layer. Moreover, the transparent electrode, since provided after the provision of the columnar spacers, can be formed continuously.

Accordingly, the resistance of the transparent electrode does not increase and thus can be prevented from adversely affecting the drive voltage of the liquid crystal layer. No part of the transparent electrode becomes particulate where it is discontinued, and leakage occurrence is avoided there.

A manufacturing method of a liquid crystal display in accordance with the present invention includes the steps of: providing a transparent electrode on a substrate to drive liquid crystal; providing an alignment layer on the transparent electrode; rubbing the alignment layer; and providing columnar spacers on the rubbed alignment layer.

According to the method, the columnar spacers are provided after the rubbing treatment of the alignment layer; therefore, the liquid crystal exhibits overall stable alignment as a result of the rubbing treatment.

Another manufacturing method of a liquid crystal display in accordance with the present invention includes the steps of: providing a black matrix layer on a substrate; providing a color filter layer; providing apertures on the black matrix layer; and providing columnar spacers in the apertures, using the apertures as a mask.

According to the method, the columnar spacers are provided in the apertures, using the apertures of the black matrix layer as a mask; therefore, self-alignment is achieved by means of the apertures. Accordingly, no mask alignment processing needs be separately performed, which facilitates manufacturing steps and makes it possible to form the columnar spacers more precisely.

The present invention will become more fully understood from the detailed description given hereinbelow and the accompanying drawings which are given by way of illustration only, are not in any way intended to limit the scope of the claims of the present invention.

BRIEF DESCRIPTION OF THE DRAWINGS

FIG. 7 is a cross-sectional view showing a structure of the major part of a liquid crystal display in accordance with another embodiment of the present invention.

DESCRIPTION OF THE EMBODIMENTS

[Embodiment 1]

The following will describe an embodiment of the present invention in reference to FIG. 1 through FIG. 6.

Figure 1:
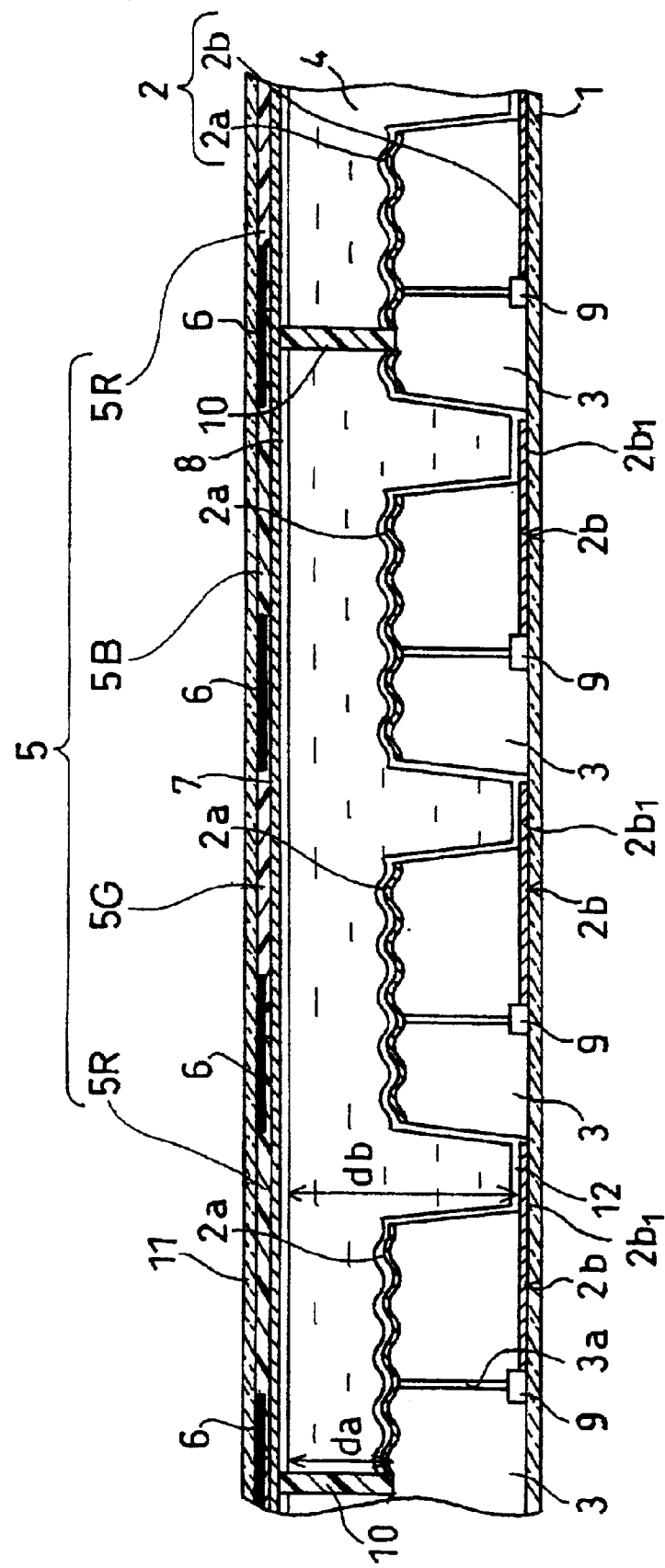
FIG. 1 is a cross-sectional view showing a structure of the major part of a liquid crystal display in accordance with an embodiment of the present invention.

FIG. 1 is a cross-sectional view showing a structure of the major part of a liquid crystal display. As shown in FIG. 1, the liquid crystal display in accordance with the present embodiment contains, between a substrate 1 and an opposite substrate 11, pixel electrodes 2, an interlayer insulation layer 3, a liquid crystal layer 4, color filters 5, black matrices (BMs) 6, a transparent electrode 7, an alignment layer 8, thin film transistors (TFTs) 9, columnar spacers 10, and another alignment layer 12.

On the substrate 1 are located the TFTs 9, the pixel electrodes 2, the interlayer insulation layer 3, and the alignment layer 12. On the opposite substrate 11 are deposited the color filters 5 with the BMs 6; the transparent electrode 7, and the alignment layer 8 in this order. The substrate 1 and the opposite substrate 11 are located opposite each other with the columnar spacers 10 therebetween.

Liquid crystal is injected between the substrates 1, 11 to form the liquid crystal layer 4.

The substrate 1 is made of glass or other material and is transparent and insulating. The pixel electrodes 2 are arranged in a matrix form. Around each pixel electrode 2 are provided a gate wire (not shown) supplying a scan signal and a source wire supplying a display signal (not shown). The gate wire and the source wire are laid out to cross at right angles and intervened by the pixel electrode 2 and the interlayer insulation layer 3 at the cross point. A TFT 9 is provided near the cross point.

Each pixel has a pixel electrode 2 that is divided into a reflection electrode (reflection section) 2a and a transmission electrode 2b including a transmission section $2b_1$. The reflection section 2a is made of a metal, such as aluminum, with a high reflectance. The transmission electrode 2b is made of ITO (an alloy of indium and tin), for example, and coupled to the associated TFT 9.

The transmission section $2b_1$ is a part of the transmission electrode 2b above which no reflection section 2a is provided. Being transparent, the transmission section $2b_1$ transmits incident light. The other part of the transmission electrode 2b is covered with the reflection section 2a and therefore receives no incident light. The pixel electrode 2 is distanced from the adjacent pixel electrodes 2 so that no electrical connection is established therebetween.

The reflection section 2a has undulations. The undulating structure is first formed on top of the interlayer insulation layer 3 by etching, for example, and the reflection section 2a is provided on top of the interlayer insulation layer 3 to reflect the underlying structure. The alignment layer 12 provided to cover the reflection section 2a also reflects the underlying undulating structure.

The structure makes it possible to use light entering at various angles and enables the pixel electrodes 2 to double as a reflector plate with excellent reflecting properties. The reflection section 2a only needs to be provided on top of the interlayer insulation layer 3 and does not necessarily cover the sides of the interlayer insulation layer 3.

The provision of the reflection section 2a serving as a reflector plate between the substrate 1 and the opposite substrate 11 prevents an overlapping, slightly displaced image from occurring because of the parallax between the liquid crystal layer 4 and the reflection section 2a and thus enables a paper white display. A brighter liquid crystal display can therefore be provided.

A part of the reflection section 2a with which the columnar spacer 10 is brought into contact is preferably flat with no undulations.

The columnar spacer 10 thus stably stands and maintains the thickness of the liquid crystal layer 4 on the reflection section 2a provided on the interlayer insulation layer 3, i.e., the reflection cell gap $d_a$.

Figure 2A:
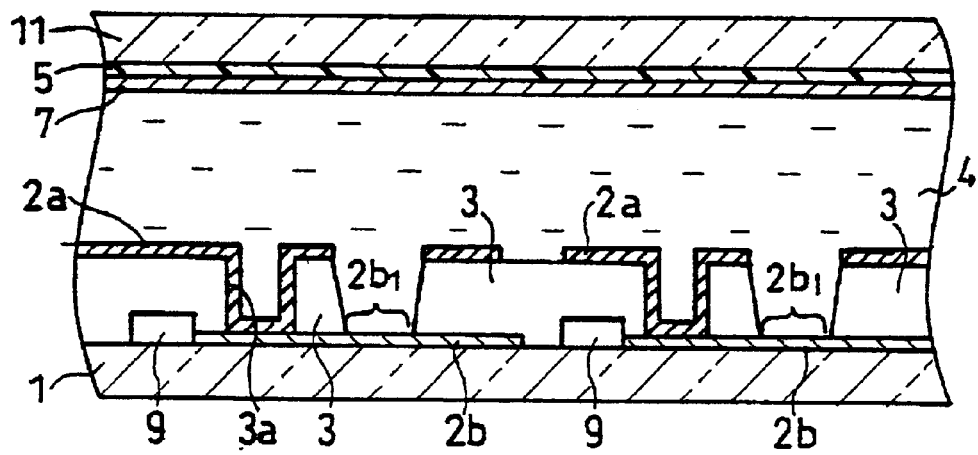
FIG. 2(a) is a cross-sectional view showing, as an example, a structure of the major part of the liquid crystal display in FIG. 1, where each pixel has a pixel electrode that is divided into a reflection section and a transmission section.
Figure 2B:
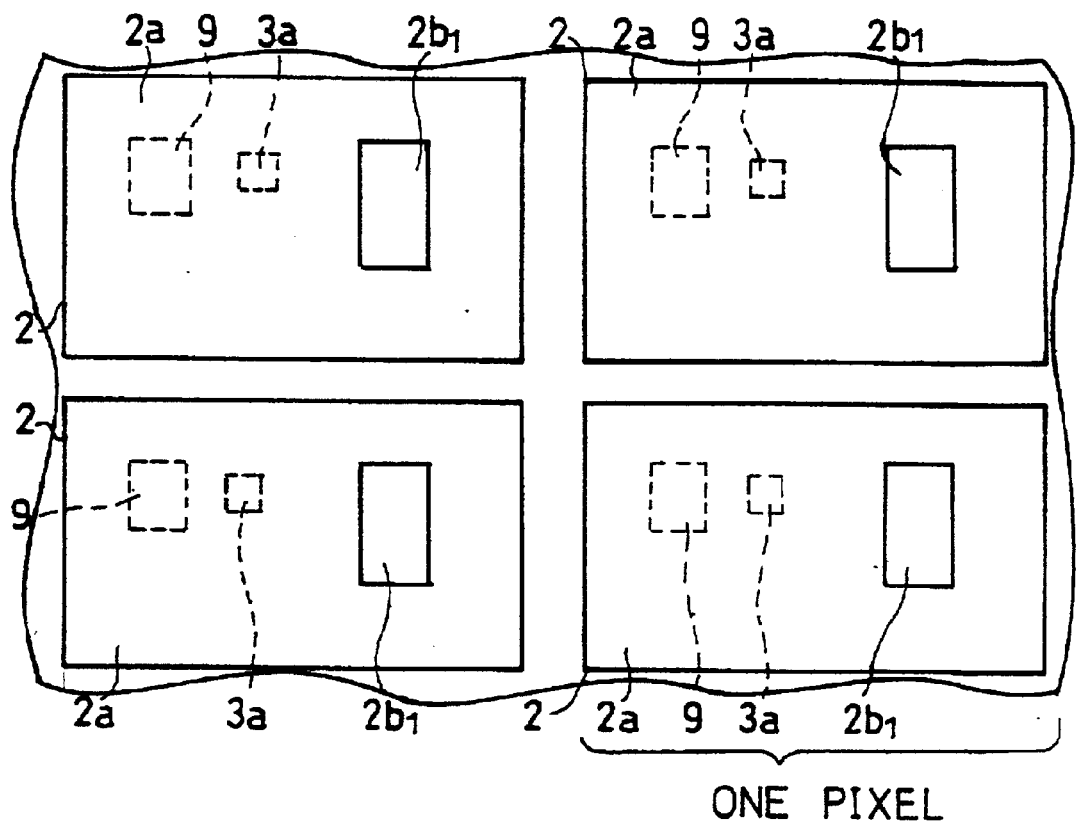
FIG. 2(b) is a plan view showing four pixel electrodes below the reflection section in FIG. 2(a).

The pixel electrodes of FIG. 1 are enlarged and shown in FIGS. 2(a), 2(b) in terms of structure in each pixel. FIG. 2(a) shows the major part of the liquid crystal display, whereas FIG. 2(b) is a plan view showing the four pixel electrodes 2 of FIG. 2(a) below the reflection section 2a.

The top of the reflection section 2a may be all flat as shown in FIG. 2(a). The flat shape eliminates the need for precise positioning when the columnar spacer 10 is brought into contact with the reflection section 2a.

Further, no reflection section 2a or wire made of conductive material is provided on the part of the interlayer insulation layer 3 with which the columnar spacer 10 is brought into contact when the substrate 1 and the opposite substrate 11 are disposed opposite each other.

Thus, at least either the top or bottom of the columnar spacer 10 is in contact with electrically insulating material; no such voltage that drives the liquid crystal layer 4 is applied in proximity to the columnar spacer 10. Potential alignment defects in proximity to the columnar spacers 10 would not entail the switching of the liquid crystal layer 4.

Therefore, in practice, alignment defects are confined in smaller regions, which enhances the reliability and display quality of the liquid crystal display.

The interlayer insulation layer 3 is made of acrylic or another resin and deposited on the substrate 1 to cover the TFT 9 and a part of the top of the transmission electrode 2b. The interlayer insulation layer 3 has contact holes 3a through predetermined parts thereof. The reflection section 2a is provided on the interlayer insulation layer 3 so as to conceal part of the contact hole 3a. The reflection section 2a is electrically connected to the transmission electrode 2b in the contact hole 3a.

The interlayer insulation layer 3 on the substrate 1 is formed to have such a thickness that satisfies the equation $$d_a:d_b=1:2$$

where $d_b$ is the transmission cell gap, i.e., the thickness of the liquid crystal layer 4 on the transmission electrode 2b.

Here, in a transmission/reflection hybrid liquid crystal display, electrical and optical properties should be matched between the transmission mode and the reflection mode. To this end, the black levels and the tone levels of the liquid crystal cell should be matched between the two modes. For this purpose, the reflection cell gap $d_a$ for reflection mode is set to a value smaller than the transmission cell gap $d_b$ for transmission mode by setting the ratio of $d_a$ and $d_b$ to 1:2 as above. Thus, if the applied potential is unchanged, the liquid crystal in polarization mode shows a smaller phase difference ($\Delta$nd) between the transmission mode and the reflection mode, thereby better matching the black levels and the tone levels of the liquid crystal cell.

The color filters 5 are disposed on the opposite substrate 11 (on the side facing the substrate 1). The color filters 5 are red (5R), green (5G), and blue (5B) and are disposed to form a repeated pattern of stripes corresponding to the individual pixels as shown in FIG. 1.

The color filters 5R, 5G, 5B are separated from one another by the BMs 6 disposed over the TFTs 9 and wire regions to interrupt light. The BMs 6 are made of resin, metal, or oxide film, for example. The BMs 6 interrupt the light emitted by the backlight which is the light source of the liquid crystal display and thereby prevents light of different colors from adjacent pixels from mixing up. Color contrast thus improves, and so does color purity.

The color filters 5 may be cyan (S), magenta (M), and yellow (Y) and disposed in a triangle.

The transparent electrode 7 is made of ITO, for example, on the color filters 5, that is, across the opposite substrate 11.

The liquid crystal display may dispense with the transparent electrode 7 in some display modes. The transparent electrode 7 is necessary when the switching of the liquid crystal is effected by applying voltage in normal direction to the substrate as in TN mode, guest-host mode, and PDLC (Polymer Dispersed Liquid Crystal) mode, for example. Conversely, the transparent electrode 7 is unnecessary when the liquid crystal is driven by an electric field parallel to the substrate as in IPS (In Plane Switching) mode.

The columnar spacers 10 are provided on some of the BMs 6 with the transparent electrode 7 intervening therebetween. The columnar spacers 10 are provided so that they can come into contact with the alignment layer 12 in proximity to the TFTs 9 when the substrate 1 and the opposite substrate 11 are disposed opposite each other.

In other words, the columnar spacers 10 are elongated in the direction connecting the substrate 1 and the opposite substrate 11 in those parts of the liquid crystal layer 4 where the thickness of the liquid crystal layer 4, i.e., the cell gap (liquid crystal cell gap), is smallest.

The columnar spacer 10 is made of a photosensitive resin, for example, Optomer NN700 (a product of JSR) and is a 3 $\mu$m high square column with a 15 $\mu$m×15 $\mu$m bottom. The columnar spacer 10 is located over the BM 6 on the blue filter 5B and separated from its adjacent columnar spacers 10 by intervals equal to the pixel pitch, for example, 300 $\mu$m.

The top surface of the transparent electrode 7 is entirely covered with the ligament layer 8 made of polyimide, etc. except those parts where the columnar spacers 10 are provided. Similarly to the transparent electrode 7, the liquid crystal display may dispense with the alignment layer 8 in some display modes. Grooves are formed by a post-rubbing treatment after the formation of the alignment layer 8 in TN mode, ECB (electrically controlled birefringence) mode, etc. Meanwhile, the alignment layer 8 is dispensable in vertical alignment mode, PDLC mode, etc.

The columnar spacers 10 are disposed between the substrate 1 and the opposite substrate 11 in this manner. The columnar spacers 10 are disposed at predetermined positions and therefore always distributed uniformly unlike spherical spacers, achieving the successful formation of the stable reflection cell gap $d_a$ and the stable transmission cell gap $d_b$. Further, since no spherical spacers are distributed and disturb the alignment of the liquid crystal, light leak in proximity to spherical spacers does not occur any longer. Contrast of pixels of the liquid crystal display thus improves.

Since the interlayer insulation layer 3 easily becomes irregular in thickness in fabrication, the columnar spacers 10 are disposed on the opposite substrate 11, not on the substrate 1 (not on the interlayer insulation layer 3).

This achieves further stabilized cell gaps, such as the reflection cell gap $d_a$ and the transmission cell gap $d_b$, when the opposite substrate 11 provided with the columnar spacers 10 is combined with the substrate 1 provided with the interlayer insulation layer 3.

The following will describe an example of manufacturing methods of the liquid crystal display.

First, the substrate 1 is fabricated together with the TFTs 9, the pixel electrodes 2, and the interlayer insulation layer 3 by repeatedly depositing and patterning a layer on the substrate 1 as in a well-known process of fabricating TFTs 9. Then, the substrate 1 is entirely covered with an alignment film which is thereafter subjected to a rubbing treatment to form the alignment layer 12.

Meanwhile, a photosensitive black resin is applied to the opposite substrate 11 using a spinner, and then illuminated, developed, and baked to form the BMs 6. A resist in which red pigment is dispersed is subsequently applied to the entire opposite substrate 11 using a spinner, illuminated using such a photomask that allows those parts that are to be colored red to be illuminated by light, and developed to form the red filters 5R. The green filters 5G and the blue filters 5B are formed likewise, and all the color filters are baked.

ITO film is provided on the entire opposite substrate, 11 and patterned to form the transparent electrode 7. Thereafter, a photosensitive resin is applied to the entire opposite substrate 11 by spincoating or another technique, illuminated by photolithography using a pattern mask, and developed to form the columnar spacers 10 at predetermined positions.

The height of the columnar spacers 10 is dictated by the thickness of the applied photosensitive resin. Then, the opposite substrate 11 is entirely covered with an alignment film which is thereafter subjected to a rubbing treatment to form the alignment layer 8.

The substrate 1 and the opposite substrate 11 are then combined using an edge sealant, and liquid crystal is injected between the substrates 1, 11 to form the liquid crystal layer 4 therebetween, which completes the manufacture of a liquid crystal cell. Finally, the liquid crystal cell is sandwiched by a polarizer, a wave plate, and a backlight with the first two elements disposed on the front and the last element on the back of the liquid crystal cell, which concludes the manufacture of a liquid crystal display.

As is detailed above, according to the present manufacturing method, the alignment layer 8 is provided after the columnar spacers 10; therefore, the material of the columnar spacers 10 and the developing liquid, etc. used in the manufacture thereof do not produce adverse effects on the alignment layer 8.

In addition, the columnar spacers 10 are provided after the transparent electrode 7; therefore, no part of the transparent electrode 7 is discontinued by the columnar spacers 10. Accordingly, the resistance of the transparent electrode 7 does not increase or adversely affect the drive voltage of the liquid crystal layer 4. Further, no part of the transparent electrode 7 becomes particulate where it is discontinued, and leakage occurrence is avoided there.

Since the alignment layer 8 is provided after the columnar spacers 10, surface tension causes the alignment layer 8 to be formed with a larger thickness in proximity to the columnar spacers 10 than in other parts. Thus, when the alignment layer 8 is subjected to a rubbing treatment, the brush may sweep insufficiently in proximity to the columnar spacers 10 and cause alignment defects.

Although the alignment defects are inevitable problems in the above manufacturing process, the alignment defects can be rendered externally less visible by providing the columnar spacers 10 on the BMs 6. By so doing, those alignment defects caused by blue pixels become less visible, while those alignment defects caused by green pixels remain visible.

Accordingly, if the columnar spacers 10 are formed only on the BMs 6 on the blue filters 5B, that is, on the blue pixels which exhibit the poorest visibility, the alignment defects occurring outside the BMs 6 become less visible.

The transmission section $2b_1$ of the pixel electrode 2 is transparent, and the alignment defects occurring in this part are highly visible. However, in the present liquid crystal display, the alignment defects that occur in proximity to the columnar spacers 10 are not as visible because the columnar spacers 10 contact the reflection section 2a when the substrate 1 and the opposite substrate 11 are combined.

Figure 3:
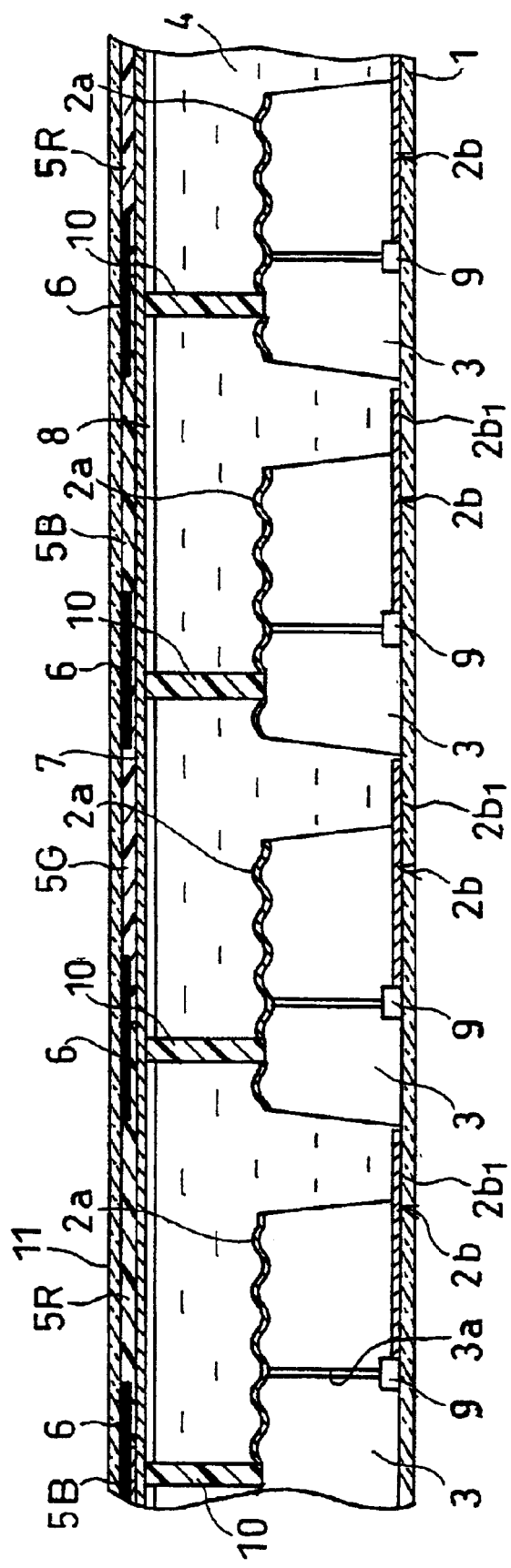
FIG. 3 is a cross-sectional view showing a structure of the major part of another liquid crystal display in accordance with an embodiment of the present invention.

Alternatively, the columnar spacers 10 may be disposed on the BMs 6 on all the pixels of the color filters 5R, 5G, 5B as shown in FIG. 3. When this is the case, each columnar spacer 10 is a 3 $\mu$m high square column with a 10 $\mu$m×10 $\mu$m bottom.

The columnar spacer 10 here is separated from its adjacent columnar spacers 10 by a 100 $\mu$m interval in the direction of the color filters 5R, 5G, 5B and by 300 $\mu$m intervals in the direction of the stripe of the color filter 5. This achieves further stabilized reflection cell gap $d_a$ and transmission cell gap $d_b$ and imparts the liquid crystal cell with improved cell gap properties.

The liquid crystal layer 4 may be made of a material that exhibits vertical alignment. When this is the case, the rubbing treatment becomes unnecessary for the manufacture of liquid crystal displays, and alignment defects caused in rubbing treatment no longer occur. In vertical alignment mode, the reflection cell gap $d_a$ and the transmission cell gap $d_b$ need to be uniform, and this requirement is met by the use of columnar spacers 10.

The substrate 1 in the foregoing liquid crystal display has been an active matrix substrate provided with the TFTs 9 thereon. A substrate with no TFTs 9 may be used instead.

Figure 4A:
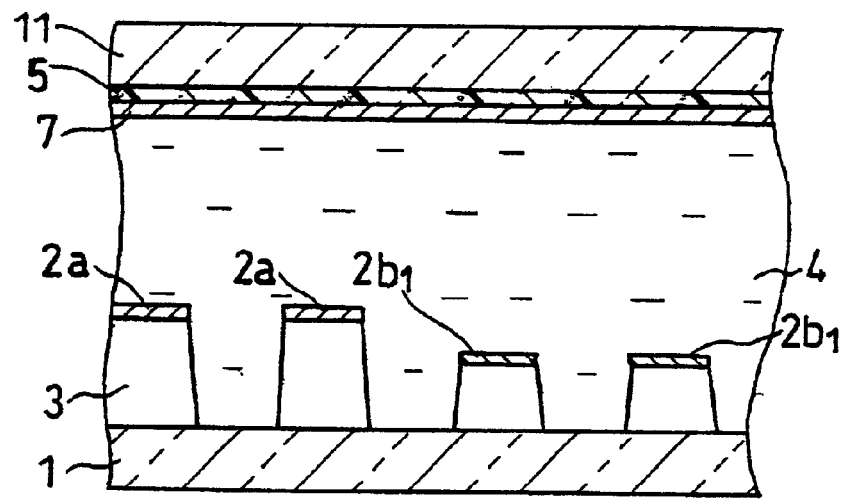
FIG. 4(a) is a cross-sectional view showing, as an example, a structure of the major part of a liquid crystal display in accordance with an embodiment of the present invention, where each pixel has a pixel electrode that is either a reflection section or a transmission section.
Figure 4B:
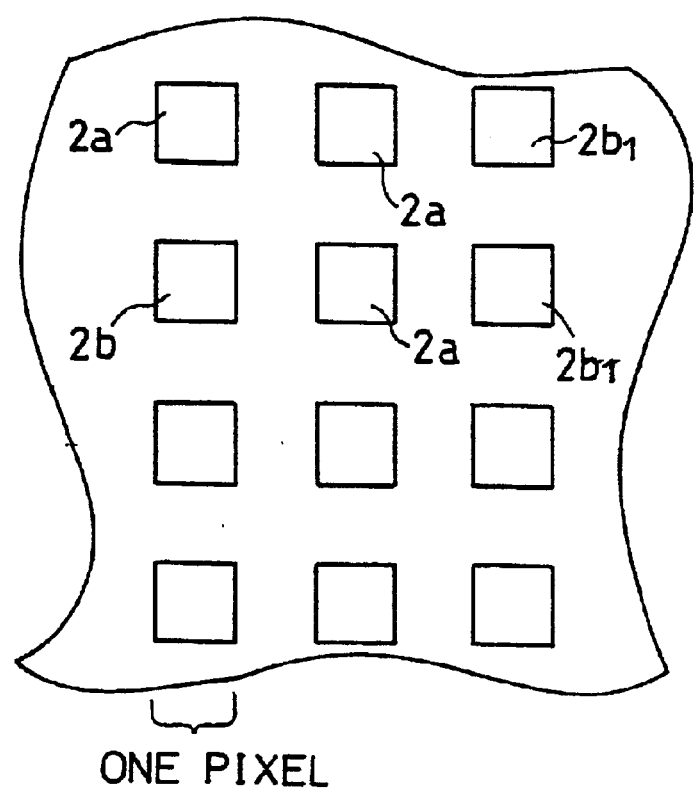
FIG. 4(b) is a plan view showing the arrangement of pixels of the liquid crystal display in FIG. 4(a) below the reflection section.

FIG. 4(a) shows a structure of the major part of a liquid crystal display in which each pixel has a pixel electrode that is either a reflection section 2a or a transmission section $2b_1$. FIG. 4(b) is a plan view showing the arrangement of pixels of the liquid crystal display in FIG. 4(a) below reflection section 2a.

The liquid crystal display in FIG. 1 (FIG. 2(a), FIG. 2(b)) has both the reflection section 2a and the transmission section $2b_1$ and hence two different cell gaps in each pixel, but may have either the reflection section 2a or the transmission section $2b_1$ in each pixel as shown in FIGS. 4(a), 4(b).

When this is the case, the reflection section 2a is located where the cell gap is smallest. In this arrangement, if the applied potential is unchanged, the liquid crystal in polarization mode shows a smaller phase difference (Δnd) between the transmission mode and the reflection mode, thereby better matching the black levels and the tone levels of the liquid crystal cell.

In display mode, such as TN mode or ECB mode, that requires the opposite substrate 11 with both the transparent electrode 7 and the alignment layer 8 provided thereon, the transparent electrode 7, the columnar spacers 10, and the alignment layer 8 can be formed in any suitable order in accordance with requirements.

According to the foregoing manufacturing method, (a) the transparent electrode 7, the columnar spacers 10, and the alignment layer 8 are formed in this order, which is followed by a rubbing treatment of the alignment layer 8. Alternatively, (b) the transparent electrode 7, the alignment layer 8, and the columnar spacers 10 may be formed in this order, which is then followed by a rubbing treatment of the alignment layer 8. In process order (b), the alignment layer 8 is formed before the columnar spacers 10.

This is likely to result in etching and developing liquids damaging the alignment layer 8. Further, if the material for the columnar spacers 10 is applied to the entire alignment layer 8, the part of the material for the columnar spacers 10 which needs to be removed will later likely remain on the alignment layer 8 without being removed and possibly adversely affect the alignment of the liquid crystal layer 4 and the reliability of the liquid crystal display.

A further alternative is to (c) form the columnar spacers 10, the transparent electrode 7, and the alignment layer 8 in this order and then subject the alignment layer 8 to a rubbing treatment. According to process order (c), the columnar spacers 10 are formed before the transparent electrode 7.

However, since the columnar spacers 10 are protrusions with a height of about 3 μm to 6 μm, it is difficult to form the transparent electrode 7 on the columnar spacers 10 by sputtering or another technique in such a manner to cover the columnar spacers 10.

Even if the transparent electrode 7 is formed to completely cover the columnar spacers 10, since the transparent electrode 7 extends to the bottom of the columnar spacers 10 on the substrate 1, there occurs electrical leakage between the substrate 1 and the opposite substrate 11.

The problem is solved by the provision of an insulation layer between the opposite substrate 11 and the transparent electrode 7 or the absence of the reflection section 2a and wires made of conductive material from the parts of the interlayer insulation layer 3 which come in contact with the columnar spacers 10 when the substrate 1 is combined with the opposite substrate 11.

Thus, at least either the top or bottom of the individual columnar spacer 10 is in contact with electrically insulating material, and the above electrical leakage can be prevented from occurring.

On the other hand, if the sides of the columnar spacers 10 are not completely covered with the transparent electrode 7, the transparent electrode 7 is formed continuously. Accordingly, the resistance of the transparent electrode 7 increases and adversely affects the drive voltage of the liquid crystal layer 4. Further, the transparent electrode 7 becomes particulate where it is discontinued, and leakage is likely to occur there.

According to process orders (b) and (c), similarly to process order (a), the columnar spacers 10 is formed before the alignment layer 8 is subjected to a rubbing treatment, and when a rubbing treatment is performed in proximity to the columnar spacers 10, alignment defects are likely to develop.

However, the provision of the columnar spacers 10 on the BMs 6 renders alignment defects externally less visible.

According to process orders (b), (c), the columnar spacers 10 are formed before the alignment layer 8. Surface tension therefore causes the alignment layer 8 to be formed with a larger thickness in proximity to the columnar spacers 10 than in other parts. Thus, when the alignment layer 8 is subjected to a rubbing treatment, the brush may sweep insufficiently in proximity to the columnar spacers 10 and adversely affect pretilt angles.

Under these circumstances, energizing the liquid crystal display may exacerbate alignment defects in proximity to thick parts of the alignment layer 8 and decrease reliability of the liquid crystal display.

In that case, it is preferred if the voltage for the liquid crystal drive is not applied to the columnar spacers 10 and the thick parts of the alignment layer 8. Accordingly, the voltage for the liquid crystal drive is prevented from being applied, by such a structure that at least either the top or bottom of the individual columnar spacer 10 is in contact with electrically insulating material.

Note that experiment showed that the alignment layer 8 is relatively thick as far as 10 μm from the columnar spacers 10 when the columnar spacers 10 are 3 μm high and 15 μm from the columnar spacers 10 when the columnar spacers 10 are 5 μm high.

The formation of the columnar spacers 10, the transparent electrode 7, and the alignment layer 8 and the rubbing treatment of the alignment layer 8 may be performed even in another order (d): the transparent electrode 7 is formed first, the alignment layer 8 is then formed and subjected to a rubbing treatment, and finally the columnar spacers 10 is formed. The formation of the columnar spacers 10 after the rubbing treatment of the alignment layer 8 stabilizes the overall alignment in the liquid crystal layer 4.

However, similarly to process order (b), the alignment layer 8 is formed before the columnar spacers 10. Most etching liquids and developing liquids used for the formation of the columnar spacers 10 are alkaline and likely to damage the alignment layer 8.

In that case, selecting a suitable material for the columnar spacers 10 can reduce the damage to the alignment layer 8 caused by some etching and developing liquids.

Figure 5:
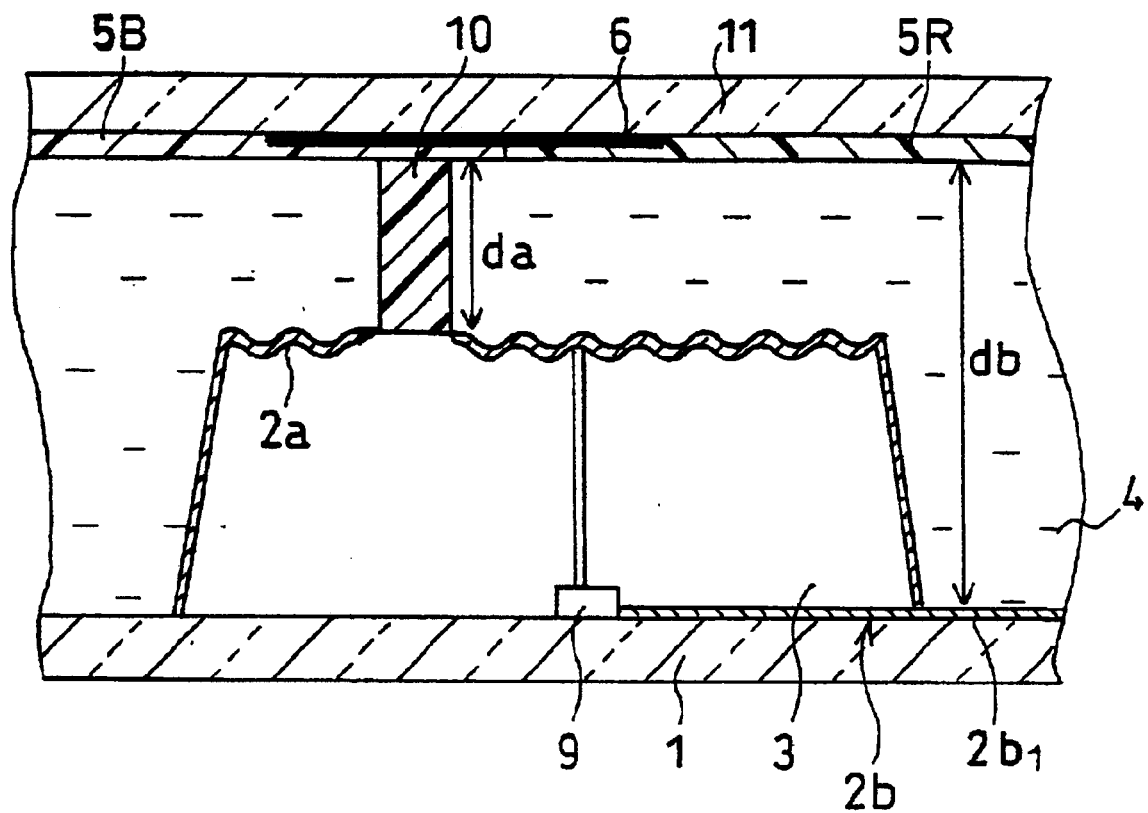
FIG. 5 is an enlarged cross-sectional view showing, as an example, a structure of the major part of a liquid crystal display in accordance with an embodiment of the present invention, where no transparent electrode or alignment layer is provided.

The opposite substrate 11 may dispense with both the transparent electrode 7 and the alignment layer 8 as shown in FIG. 5. In that case, the height of the columnar spacers 10 equal the reflection cell gap $d_a$.

Therefore, the transmission cell gap $d_b$ is dictated by the thickness of the interlayer insulation layer 3 underlying the reflection section 2a and the reflection cell gap $d_a$, that is, the height of the columnar spacers 10. Here, the columnar spacers 10 needs to be designed in advance with such a height to contact the interlayer insulation layer 3.

Next, the following will describe the columnar spacers 10 in detail.

The material for the columnar spacers 10 may be either organic or inorganic. Examples include resists, rubber photoresists, and cyclized polyisoprene photoresists. Commercial products like OMR-83 (manufactured by Tokyo Ohka Kogyo Co., Ltd.) and CBR-M901 (manufactured by JSR) fall in these categories. HTPR-1100 (manufactured by Toray Industries, Inc.) and other polyimides exhibiting satisfactory photosensitivity are also suitable as the material for the columnar spacers 10.

Further examples include RGB and black photosensitive coloring resins, positive and negative resists, polysiloxanes, and polysilanes used for the color filters 5, etc. A suitable inorganic example is $SiO_2$.

NN700 (manufactured by JSR) may be used to form the columnar spacers 10 after NN700 is colored black with black pigment. The columnar spacers 10 thus formed are black and affect display quality only to a limited extent even when the columnar spacers 10 are formed external to the BMs 6.

Preferable (horizontal) cross-sectional shapes of the columnar spacers 10 taken parallel to the opposite substrate 11 include quadrilaterals, triangles, and other polygons; circles, ellipses, and stripes.

When the columnar spacers 10 are formed before the alignment layer 8 is subjected to a rubbing treatment, a preferable (vertical) cross-sectional shape of the columnar spacers 10 taken parallel to the normal to the liquid crystal display is a forward taper shape in which the columnar spacers 10 tapers toward the substrate 1.

Table 1 shows properties of the liquid crystal cell with respect to the ratio of the area of the columnar spacers 10 for 1 $mm^2$ of the panel area.

TABLE 1

| Area Ratio of Columnar Spacers (%) | Properties of Liquid Crystal Layer |
| --- | --- |
| 0.02 | ▲ Stable Cell Gap Unavailable |
| 0.05 | ○ |
| 0.1 | ○ |
| 0.5 | ○ |
| 1.0 | ○ |
| 2.0 | ○ |
| 3.0 | ○ |
| 4.0 | ▲ Bubbles Formed below −40° C. |

It can be seen from Table 1, that to obtain a stable reflection cell gap $d_a$ and transmission cell gap $d_b$ and a highly reliable liquid crystal cell, the columnar spacers 10 preferably account for 0.05% to 3.0% of the cross-sectional area of the panel of the liquid crystal display taken parallel to the substrate 1 and the opposite substrate 11.

Incidentally, when the area ratio of the columnar spacers 10 was 0.02%, the columnar spacers 10 deformed under the burden (about 1 ton) to combining the substrate 1 and the opposite substrate 11. The circle in the table indicates that the liquid crystal panel does not feel supple when pressed by the finger.

Table 2 shows standard deviations of cell gaps when 500 spherical spacers were distributed in every 1 $mm^2$ of the panel and when the columnar spacers 10 with a quadrilateral bottom measuring 15 $\mu$m×15 $\mu$m were used.

TABLE 2

| Types of Spacers | Shape of Contact Region | Standard Deviation (σ) | Number of Panels |
| --- | --- | --- | --- |
| Columnar Spacers (Quadrilateral Bottom measuring 15 $\mu$m × 15 $\mu$m; Interval = 300 $\mu$m) | Flat | 0.05 | 100 |
| Columnar Spacers (Quadrilateral Bottom measuring 15 $\mu$m × 15 $\mu$m; Interval = 300 $\mu$m) | Undulating | 0.09 | 100 |
| Spherical Spacers (500 pieces / $mm^2$) | Undulating | 0.15 | 100 |

Table 2 shows two cases for the use of columnar spacers 10: the shape of the regions to contact the columnar spacers 10 when the substrate 1 and the opposite substrate 11 were combined was flat in one case and undulating in the other.

Table 2 shows that the columnar spacers 10 imparted far more stable cell gap properties than the distributed spherical spacers.

Figure 6:
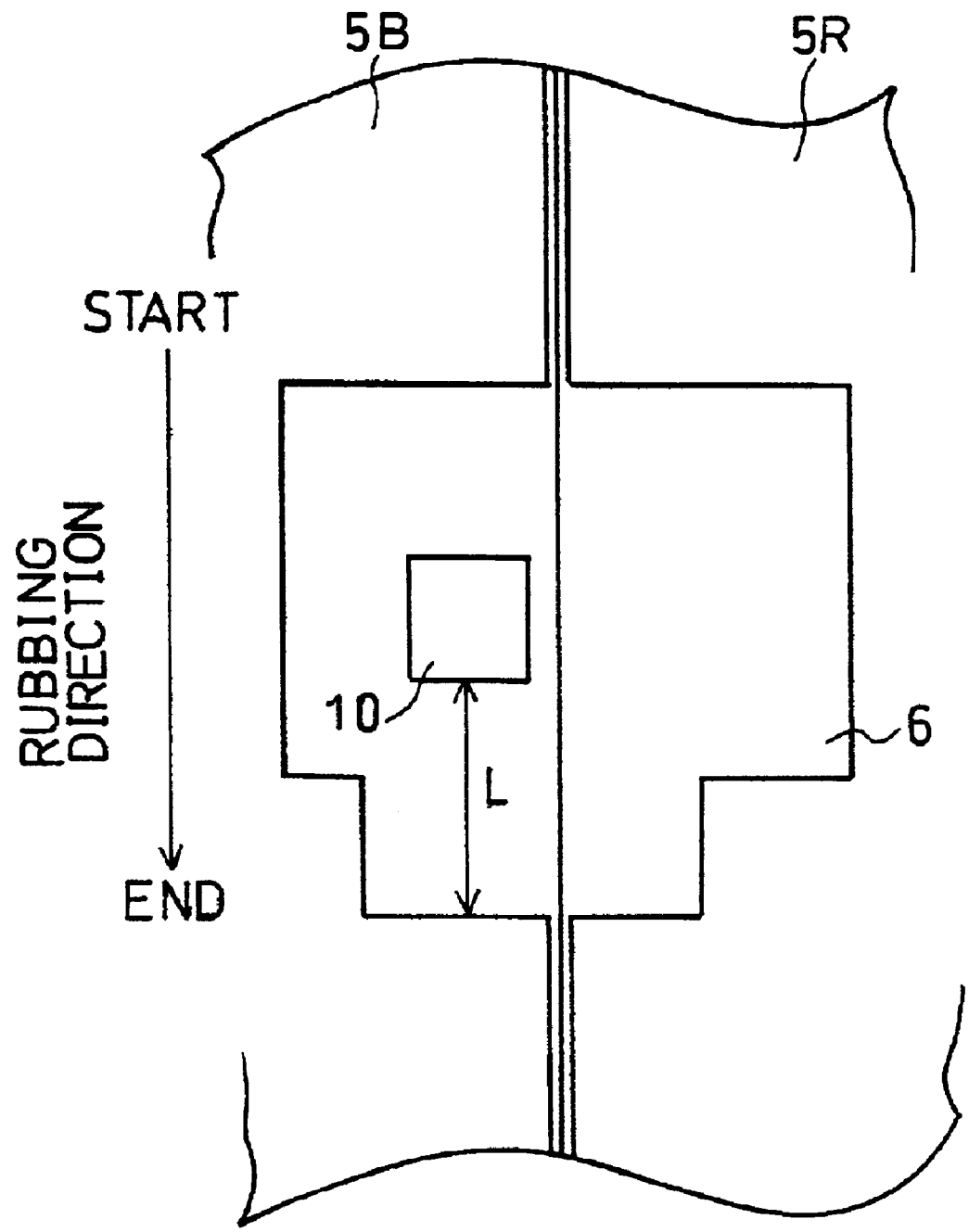
FIG. 6 is an explanatory drawing showing a BM and its vicinity of FIG. 1, as well as the direction of a rubbing treatment.

Table 3 shows the size of the region needed to be concealed by the BMs 6 to render alignment defects externally less visible. FIG. 6 shows the direction in which the alignment layer 8 is rubbed in the rubbing treatment.

TABLE 3

| Height of Columnar Spacers ($\mu$m) | Extension of Alignment Defects ($\mu$m) | Region to be Concealed by BMs ($\mu$m) (Distance from Columnar Spacer) |
| --- | --- | --- |
| 3 | 10 | 10 |
| 5 | 15 | 15 |

When the columnar spacers 10 were 3 $\mu$m high, the alignment defects extended as far as 10 $\mu$m from the columnar spacers 10 toward the end point of the rubbing. When the columnar spacers 10 were 5 $\mu$m high, the alignment defects extended as far as 15 $\mu$m from the columnar spacers 10 toward the end point of the rubbing.

Accordingly, as shown in FIG. 6, the distance L needs to be not less than 10 $\mu$m from the edge of the 3 $\mu$m high columnar spacer 10 and not less than 15 $\mu$m from the edge of the 5 $\mu$m high columnar spacer 10.

Considering possible further extension of alignment defects due to energizing over an extended period of time, the BMs 6 need to cover larger regions. Conversely, if the BMs 6 conceal too large regions, the display area of the liquid crystal display is limited. For these reasons, the BMs 6 conceal not more than 20 $\mu$m from the spacers 10 toward the end point of the rubbing.

The extension of the alignment defects varies depending on the mode in which the liquid crystal display is used, the height of the columnar spacers 10, the sequence of manufacturing steps, and other conditions.

[Embodiment 2]

Figure 8:
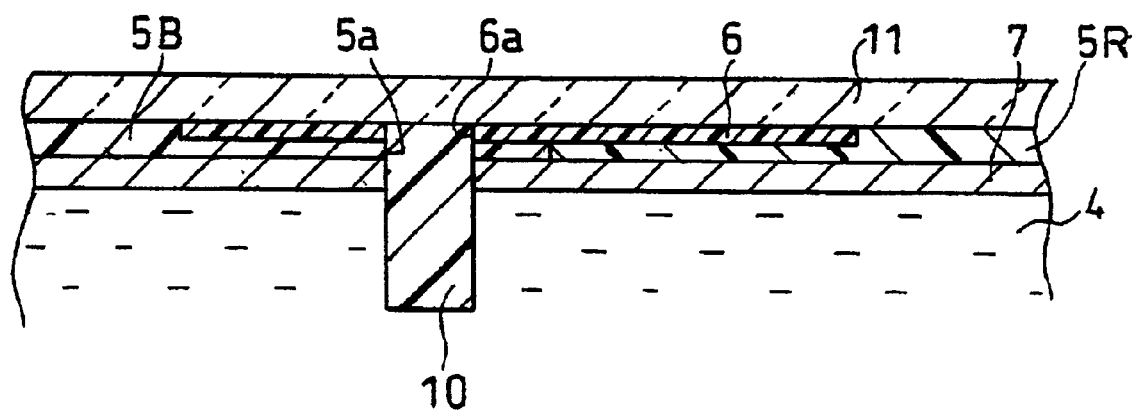
FIG. 8 is a cross-sectional view showing a structure of the major part of the opposite substrate of a liquid crystal display in accordance with another embodiment of the present invention.
Figure 9:
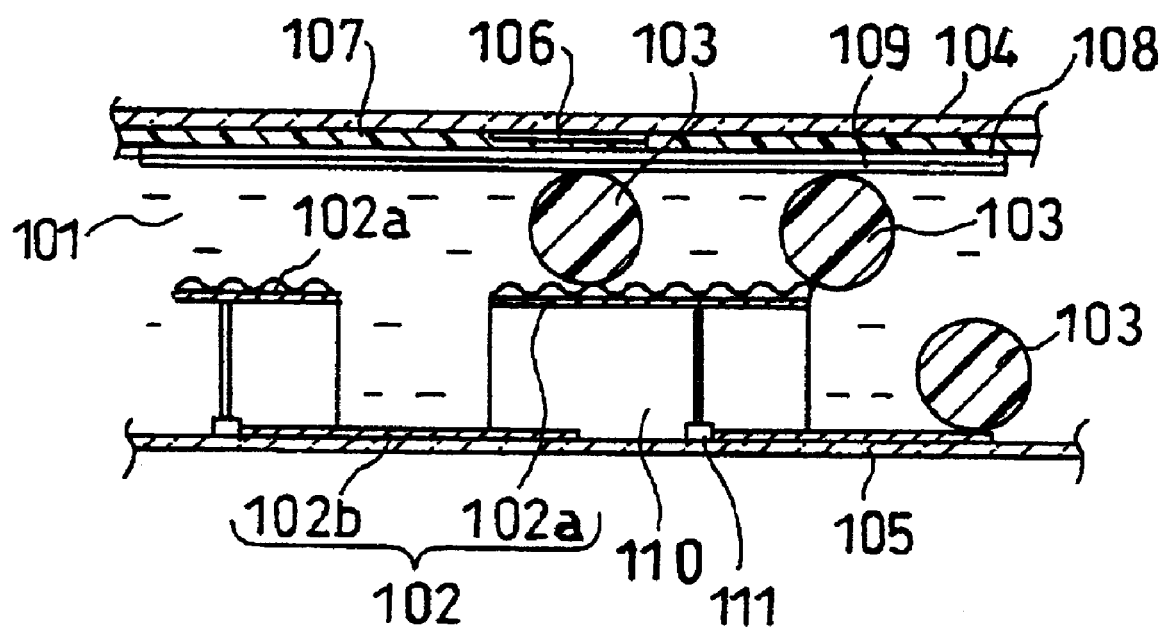
FIG. 9 is a cross-sectional view showing a structure of the major part of a conventional liquid crystal display.
Figure 10A:
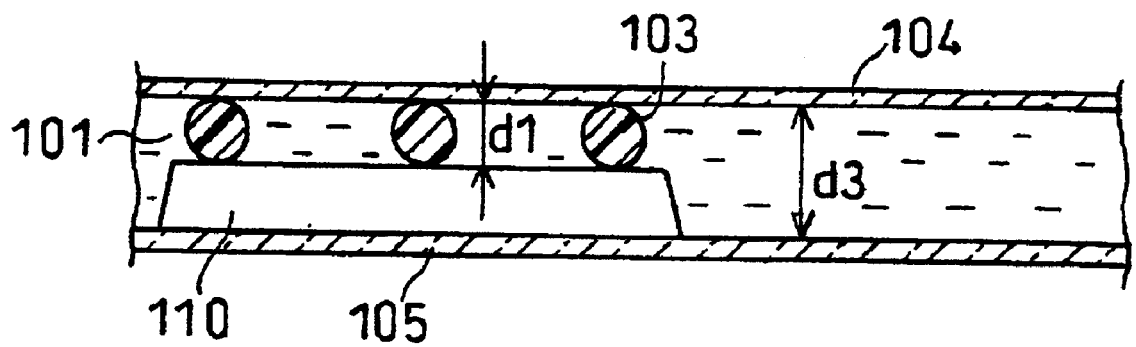
FIG. 10(a) is an explanatory drawing showing a conventional liquid crystal display in which there are provided relatively many spherical spacers.
Figure 10B:
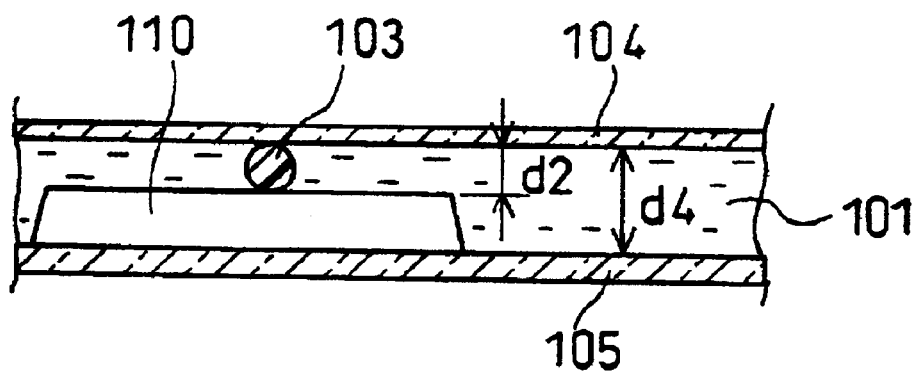
FIG. 10(b) is an explanatory drawing showing a conventional liquid crystal display in which there are provided relatively few spherical spacers.
Figure 11:
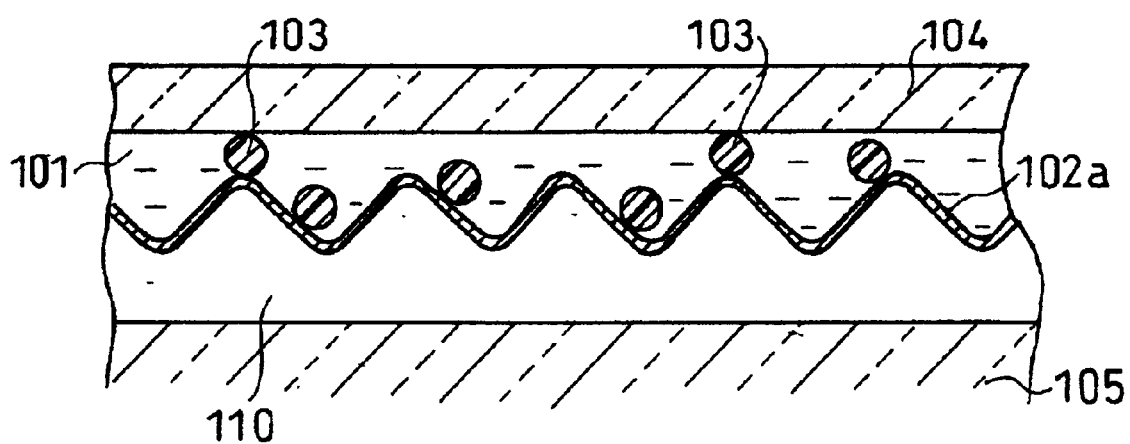
FIG. 11 is a detailed view showing how spherical spacers are used in a conventional liquid crystal display with a reflection region with undulations.

The following will describe another embodiment of the present invention in reference to FIGS. 7, 8. Here, for convenience, members of the present embodiment that have the same arrangement and function as members of the previous embodiment, and that are mentioned in that embodiment are indicated by the same reference numerals and description thereof is omitted.

FIG. 7 is a cross-sectional view of the major part of a liquid crystal display in accordance with an embodiment of the present invention. FIG. 8 is an enlarged explanatory drawing showing the major part of an opposite substrate 11 of FIG. 7. The substrate 1 disposed opposite the opposite substrate 11 with an intervening liquid crystal layer 4 is identical in the present embodiment and in embodiment 1 as shown in FIG. 7.

As shown in FIG. 8. the opposite substrate 11 here has color filters 5 with BMs 6, columnar spacers 10, and a transparent electrode 7 on the opposite substrate 11 as in embodiment 1. Each blue filter 5B has an aperture 5a, while the BM 6 under the blue filter 56 has an aperture 6a.

The aperture 5a opens above the aperture 6a. A columnar spacer 10, made of a black resin, stands from the aperture 6a and the aperture 5a with the bottom on the opposite substrate 11. In this structure, the columnar spacer 10 can interrupt the light emitted from a backlight with no BM 6 in the aperture 6a.

The columnar spacer 10 is not necessarily black and may be transparent as long as it does not transmit the light from the backlight.

To form the columnar spacers 10 in accordance with the present embodiment, the aperture 5a and the aperture 6a are first opened through the color filter 5. The part of the opposite substrate 11 which is illuminated in the apertures 6a, 5a is formed in an identical shape to that of the bottom of the columnar spacer 10, for example, a 15 μm×15 μm quadrilateral.

Photosensitive, black material is then applied to the color filter 5. Light is shone on a side of the opposite substrate 11 where no color filter 5 is provided, using the part inside the apertures 5a, 6a as a mask, to project a pattern. Self-alignment is thus achieved. Accordingly, no mask alignment processing needs to be separately performed, which facilitates manufacturing steps and makes it possible to form the columnar spacers 10 more precisely.

As detailed so far, a liquid crystal display in accordance with the present invention has spacers for maintaining a liquid crystal layer and a liquid crystal cell gap between two opposing substrates, the liquid crystal layer varying in thickness either within a single pixel or from one pixel to another, wherein the spacers are of columnar shape elongated in a direction connecting the two substrates and are provided where the liquid crystal layer is thinnest.

Generally, it is more difficult to control a small cell gap than a large cell gap. However, according to the structure, the spacers are of columnar shape elongated in the direction connecting the two substrates and are provided where the liquid crystal layer is thinnest; therefore, the structure ensures the cell gap where the liquid crystal layer is thin, that is, the cell gap is small.

However, according to the structure, the thickness of the liquid crystal layer is easily controllable. Further, the two substrates are subjected to uniform pressure in the combining step of the two substrates. A uniform cell gap is stably obtainable in the step because of the columnar spacers provided where the liquid crystal layer is thin and it is hence most difficult to control the cell gap.

The liquid crystal display is preferably such that one of the two substrates is provided with liquid crystal drive electrodes composed of reflection electrodes and transmission electrodes; an interlayer insulation layer is provided on the substrate where the liquid crystal layer is thinnest; and the reflection electrodes are provided on the interlayer insulation layer.

According to the structure, the reflection electrodes are provided where the liquid crystal layer is thinnest; therefore, the phase difference between the transmission mode and the reflection mode is reduced, thereby better matching the black levels and the tone levels of the liquid crystal cell. Electrical and optical properties can be thus matched between the transmission mode and the reflection mode.

The liquid crystal display is preferably such that the reflection electrodes have a surface composed of an undulating part where incident light is scattered and a flat part which the columnar spacers contact.

According to the structure, the reflection electrode has a surface composed of an undulating part where incident light is scattered. The structure makes it possible to use light entering at various angles and enables the liquid crystal drive electrodes to double as a reflector plate with excellent reflecting properties. Further, the contact of the columnar spacers with the flat part of the surface allows the columnar spacers to be stably situated, thereby stably maintaining the cell gap. A highly reliable liquid crystal display can be thus offered.

The liquid crystal display is preferably such that the liquid crystal layer has the largest thickness equal to a sum of a height of the columnar spacers and a thickness of the interlayer insulation layer.

According to the structure, the phase difference between transmission mode and reflection mode can be reduced, thereby matching electrical and optical properties between the transmission mode and the reflection mode.

The liquid crystal display is preferably such that there are provided a color filter layer and a black matrix layer on one of the two substrates; and the columnar spacers are provided on the black matrix layer.

According to the structure, the columnar spacers are provided on the black matrix layer, rendering the alignment defects occurring in proximity to the columnar spacers externally less visible. This prevents the liquid crystal display from deteriorating in contrast between pixels. A liquid crystal display can be thus offered with good display quality.

The liquid crystal display is preferably such that the columnar spacers are provided on blue filters in the color filter layer.

According to the structure, the provision of the columnar spacers on the blue filters in the color filter layer. The structure renders the alignment defects occurring outside the black matrix layer less visible as long as the defects occur on the blue filters which exhibit the poorest visibility. A highly reliable liquid crystal display can be thus offered with good display quality.

The liquid crystal display is preferably such that the black matrix layer has apertures in which the columnar spacers are provided.

According to the structure, the columnar spacers are provided in the apertures; a manufacturing method can be thus employed whereby columnar spacers are formed in apertures, using the apertures of the black matrix layer as a mask.

Therefore, self-alignment is achieved by means of the apertures. Accordingly, no mask alignment processing needs be separately performed, which facilitates manufacturing steps and makes it possible to form the columnar spacers more precisely. A liquid crystal display can be thus manufactured with a more stable cell gap and in fewer manufacturing steps.

The liquid crystal display is preferably such that the columnar spacers are black.

According to the structure, the columnar spacers are black; therefore, with no black matrix layer in the apertures, the columnar spacers can still interrupt the light from a backlight and thereby affect visual display quality only to a limited extent.

The liquid crystal display is preferably such that the liquid crystal layer a material exhibiting vertical alignment.

According to the structure, the liquid crystal layer is made of a material exhibiting vertical alignment; a manufacturing method with no rubbing treatment can be thus employed for the liquid crystal display. Alignment defects occurring in a rubbing treatment can be therefore eliminated.

A manufacturing method of a liquid crystal display in accordance with the present invention includes the steps of: providing a transparent electrode on a substrate to drive liquid crystal; providing columnar spacers on the transparent electrode; and providing an alignment layer on the entire substrate.

According to the method, the provision of the columnar spacers enables the liquid crystal display to exhibit uniform and stable cell gap properties. The provision of the alignment layer after that of the columnar spacers prevents the material and developing liquid used in providing the columnar spacers from adversely affecting the alignment layer.

Moreover, the transparent electrode, since provided after the provision of the columnar spacers, can be formed continuously. Accordingly, the resistance of the transparent electrode does not increase and thus can be prevented from adversely affecting the drive voltage of the liquid crystal layer.

No part of the transparent electrode becomes particulate where it is discontinued, and leakage occurrence is avoided there. A highly reliable liquid crystal display can be thus offered.

A manufacturing method of a liquid crystal display in accordance with the present invention includes the steps of: providing a transparent electrode on a substrate to drive liquid crystal; providing an alignment layer on the transparent electrode; rubbing the alignment layer; and providing columnar spacers on the rubbed alignment layer.

According to the method, the columnar spacers are provided after the rubbing treatment of the alignment layer; therefore, the liquid crystal exhibits overall stable alignment as a result of the rubbing treatment.

A manufacturing method of a liquid crystal display in accordance with the present invention includes the steps of: providing a black matrix layer on a substrate; providing a color filter layer; providing apertures on the black matrix layer; and providing columnar spacers in the apertures, using the apertures as a mask.

According to the method, the columnar spacers are provided in the apertures, using the apertures of the black matrix layer as a mask; self-alignment is thus achieved by means of the apertures.

Accordingly, no mask alignment processing needs be separately performed, which facilitates manufacturing steps and makes it possible to form the columnar spacers more precisely. A liquid crystal display can be thus manufactured with a more stable cell gap and in fewer manufacturing steps.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display with two opposing substrates sandwiching therebetween a liquid crystal layer variable in thickness either within a single pixel or from one pixel to another, said display comprising:
   a plurality of columnar spacers between the two substrates where the liquid crystal layer is thinnest, the columnar spacers being elongated in a direction connecting the two substrates to maintain a cell gap;
   one of the two substrates being provided with liquid crystal drive electrodes composed of reflection electrodes and transmission electrodes;
   an interlayer insulation layer being provided on the substrate where the liquid crystal layer is thinnest; and
   the reflection electrodes being provided on the interlayer insulation layer.

2. The liquid crystal display as defined in claim 1, wherein the reflection electrodes have a surface composed of an undulating part where incident light is scattered and a flat part which the columnar spacers contact.

3. The liquid crystal display as defined in claim 1, wherein the liquid crystal layer has the largest thickness equal to a sum of a height of the columnar spacers and a thickness of the interlayer insulation layer.

4. The liquid crystal display as defined in claim 1, wherein:
   there are provided a color filter layer and a black matrix layer on one of the two substrates; and
   the columnar spacers are provided on the black matrix layer.

5. The liquid crystal display as defined in claim 4, wherein the columnar spacers are provided on blue filters in the color filter layer.

6. The liquid crystal display as defined in claim 4, wherein the black matrix layer has apertures in which the columnar spacers are provided.

7. The liquid crystal display as defined in claim 4, wherein the columnar spacers are black.

8. The liquid crystal display as defined in claim 1, wherein the liquid crystal layer is made of a material exhibiting vertical alignment.

9. The liquid crystal display as defined in claim 1, wherein:
   in a cross-section of a panel taken parallel to the two substrates, the columnar spacers account for 0.05% to 3.0% of the panel in area.

10. A liquid crystal display with two opposing substrates sandwiching therebetween a liquid crystal layer variable in thickness either within a single pixel or from one pixel to another, wherein:
    a reflection section that reflects incident light is provided where the thickness of the liquid crystal layer is small, while a transmission section that transmits incident light is provided where the thickness of the liquid crystal layer is different from the thickness of the liquid crystal layer in the reflections section; and
    there are provided columnar spacers on the reflection section between the two substrates, the columnar spacers being elongated in a direction connecting the two substrates to maintain a cell gap.

11. The liquid crystal display as defined in claim 4, wherein
    the columnar spacers are provided on the black matrix layer so that a distance from an edge of the black matrix layer is longer than an extension of alignment defects that occur in proximity to the columnar spacers.

12. The liquid crystal display as defined in claim 4, wherein
a height of the columnar spacers is set so that a distance from an edge of the black matrix layer is longer than an extension of alignment defects that occur in proximity to the columnar spacers.

13. The liquid crystal display as defined in claim 4, wherein
the black matrix layer is subjected to a rubbing treatment; and
a length of the black matrix layer in a direction of the rubbing treatment is longer than an extension of alignment defects that occur in proximity to the columnar spacers.

14. The liquid crystal display as defined in claim 13, wherein
the black matrix layer conceals not more than 20 $\mu$m from the columnar spacers toward an end point of the rubbing.

* * * * *

UNITED STATES PATENT AND TRADEMARK OFFICE
CERTIFICATE OF CORRECTION

PATENT NO. : 6,864,945 B2  
DATED : March 8, 2005  
INVENTOR(S) : Fujimori et al.

It is certified that error appears in the above-identified patent and that said Letters Patent is hereby corrected as shown below:

<u>Title page,</u>  
Item [56], should read  
-- Foreign Patent Documents  
    JP 8-234190        9/1996 --

Signed and Sealed this

Nineteenth Day of July, 2005

JON W. DUDAS  
*Director of the United States Patent and Trademark Office*